Figure 1:
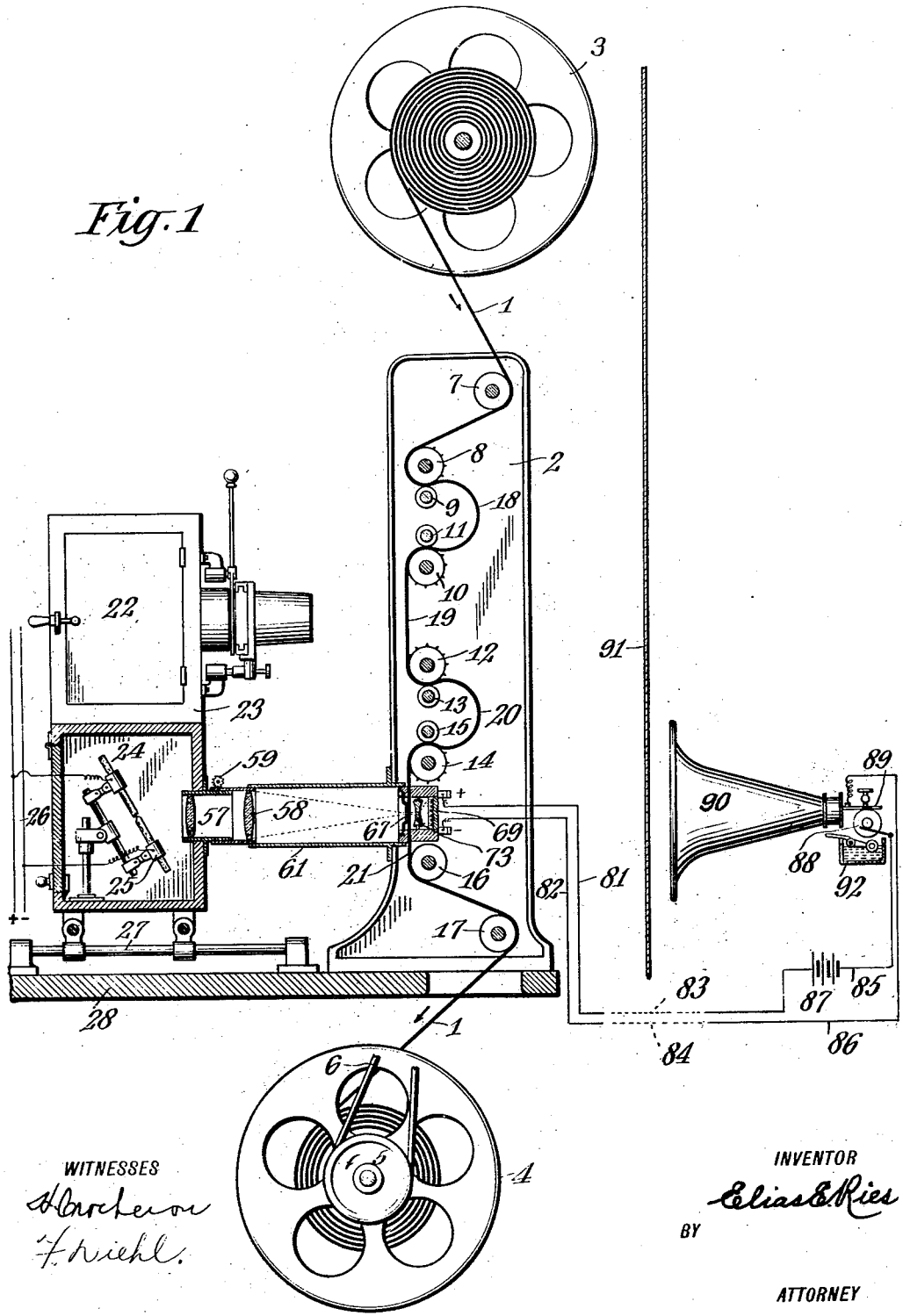

Nov. 16, 1926.

E. E. RIES 1,607,480

METHOD OF REPRODUCING PHOTOGRAPHIC SOUND RECORDS

Filed May 21, 1913

3 Sheets-Sheet 1

WITNESSES

INVENTOR
Elias E. Ries
BY

ATTORNEY

Nov. 16, 1926. 1,607,480
E. E. RIES
METHOD OF REPRODUCING PHOTOGRAPHIC SOUND RECORDS
Filed May 21, 1913   3 Sheets-Sheet 2
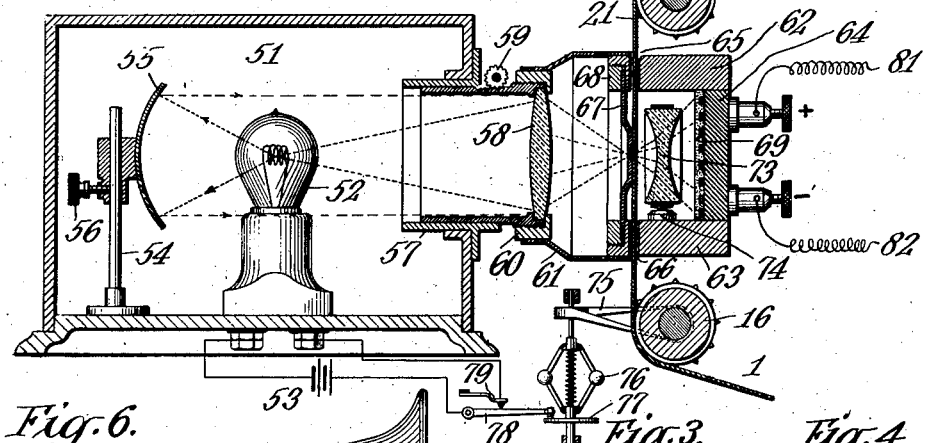
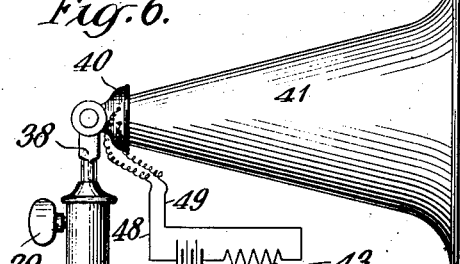
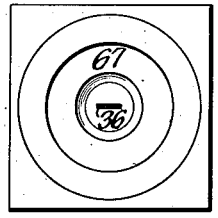
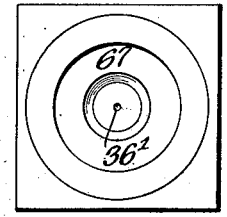
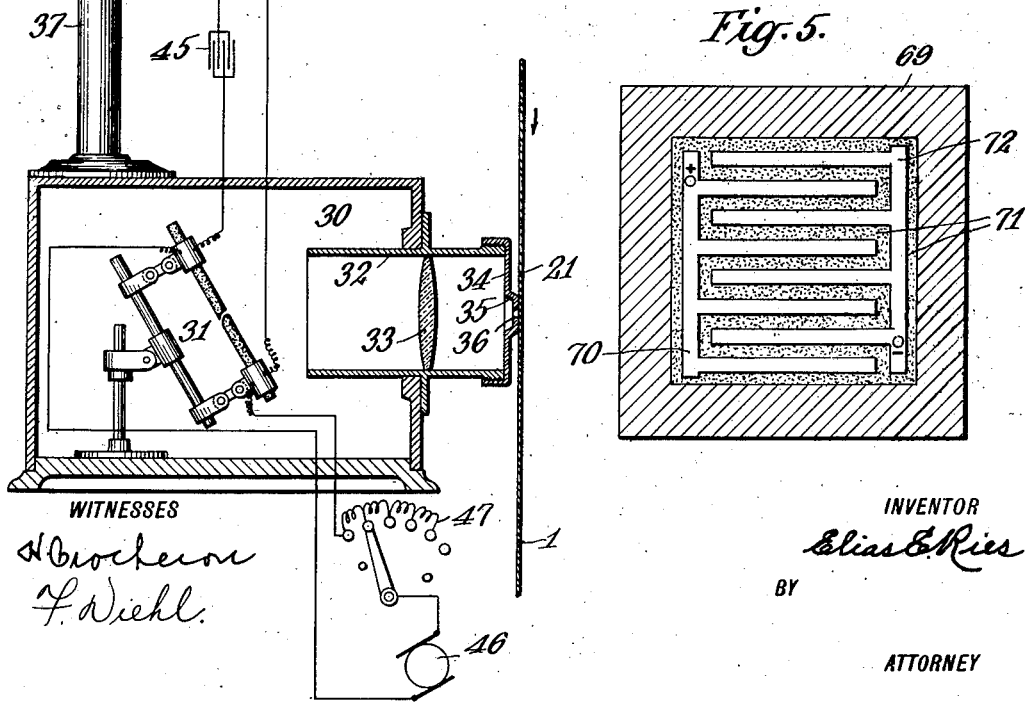
WITNESSES
INVENTOR
Elias E. Ries
BY
ATTORNEY Nov. 16, 1926.
E. E. RIES
1,607,480
METHOD OF REPRODUCING PHOTOGRAPHIC SOUND RECORDS
Filed May 21, 1913
3 Sheets-Sheet 3
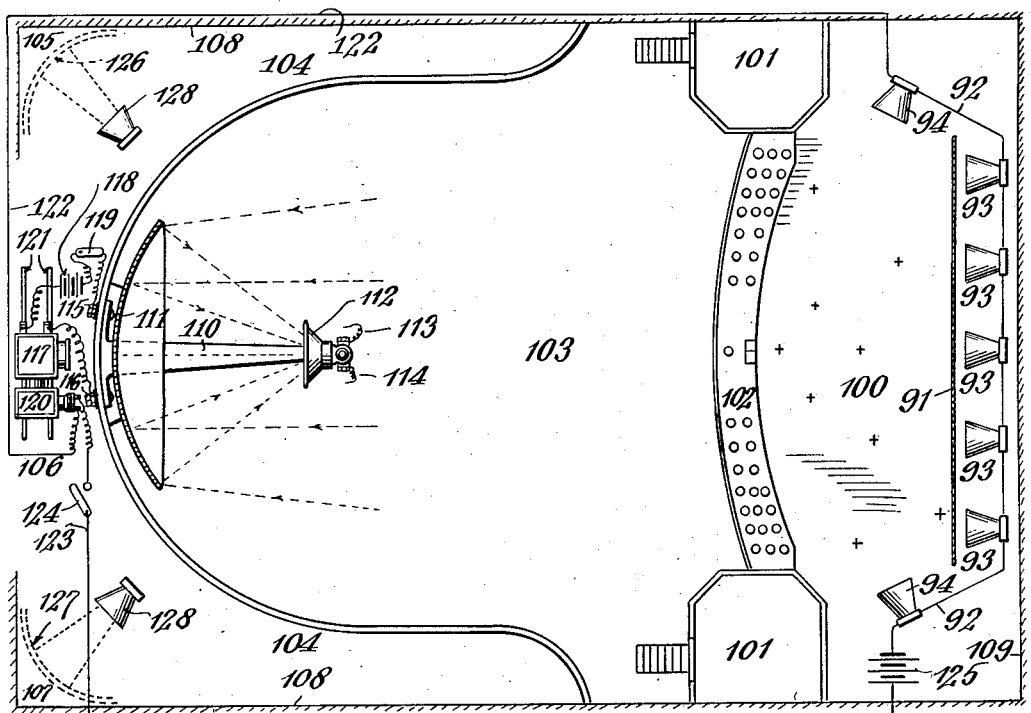

Patented Nov. 16, 1926.

1,607,480

UNITED STATES PATENT OFFICE.

ELIAS E. RIES, OF NEW YORK, N. Y., ASSIGNOR, BY MESNE ASSIGNMENTS, TO DE-FOREST PHONOFILM CORPORATION, OF NEW YORK, N. Y., A CORPORATION OF DELAWARE.

METHOD OF REPRODUCING PHOTOGRAPHIC SOUND RECORDS.

Application filed May 21, 1913, Serial No. 769,114. Renewed April 14, 1923.

This invention relates to the method and apparatus for making photographic records of sound by causing the sounds that are to be recorded to produce varying electrical impulses in an electric circuit which in turn cause varying intensities of light for affecting a photographic film. And more particularly it relates to combined motion pictures and sound records photographed on the same film. Also to methods and apparatus for reproducing such sound records or combined motion pictures and sound records.

In carrying my invention into effect I produce a record in the form of a continuous photographic band or stripe of uniform width and of varying degrees of density in the direction of its length corresponding to sound waves impressed upon a diaphragm which cause corresponding varying impulses in an electric circuit. This record is produced by moving the photographic film behind an apertured screen having preferably a very narrow slit aperture with the film in such relation thereto that the area of exposure will be limited to the area of the slit or aperture, and the light rays being so focused upon the screen that the aperture will be flooded with light and affect the sensitive surface of the film uniformly over the exposed area; the purpose of limiting the area of exposure to the area of the slit aperture being to prevent diffusion of light rays beyond the direct image of the aperture. The photographic film at the point where it passes behind the apertured screen moves continuously at a uniform speed, so that when the light remains constant there will result a continuous band of uniform width and density throughout, but as the intensity of the light rays vary in accordance with the varying impulses in the circuit produced by the sound waves impressed on the receiving diaphragm, the density of the band will vary in the direction of movement of the film to a greater or lesser degree than the normal. In other words, when the light remains constant the density of the exposed area will be the mean density, and as the diaphragm vibrates due to sound waves impressed thereon and producing the varying electrical impulses in the circuit, this density will increase to maximum and then decrease to minimum and back to mean density for each complete vibration or cycle. This, owing to the rapidity of the vibrations, results in a record having the appearance of successive lines or stripes extending crosswise of the record band, the lines (in a negative) shading gradually from mean to maximum and then through the mean to minimum and back again to mean density, giving the appearance of waves throughout the length of the record band, and the lines or points of greatest density indicating the crests and the points of least density the hollows of sound waves corresponding to the vibrations of the diaphragm.

To reproduce such a record, I employ a method (which is the subject matter of the present application) in which light rays of constant luminosity are projected through an apertured screen similar to the screen employed in making the record, and the record film is moved constantly at a uniform speed in such relation to the aperture, that only an area equal to the area of the aperture will be exposed to the light rays, and the light rays passing through the record film of varying opacity will be projected upon a light sensitive cell or plate, such as selenium. This cell is connected in an electric circuit connected with a sound reproducing device or telephone, and in accordance with the variations in light rays passing through the record, the light sensitive cell will produce variations in the resistance or cause varying impulses in said circuit to actuate said sound reproducing device or telephone.

In the drawings, Figure 1 is a view partly in section and partly in diagram of the apparatus for reproducing talking motion pictures; Figure 2 is a similar view showing a modified form of the sound reproducing part of the apparatus; Figures 3 and 4 views of two forms of apertured screen for the sound record; Figure 5 a sectional view of the selenium cell; Figure 6 a view partly in section and partly in diagram of one form of that part of the apparatus used for recording the sounds; Figure 7 a plan of a theater showing a stage, orchestra and balcony, with apparatus for taking and reproducing talking motion pictures;

Figure 8 shows an ordinary motion picture film with a single sound record indicated thereon; Figure 9 shows a film with two records thereon, one on each side outside of the sprocket holes; Figure 10 shows a film of extra width affording space for larger picture and sound records; Figure 11 shows a modified form of film in which the picture and sound records are made while moving the film in a horizontal direction instead of vertical; Figure 12 is a view on a large scale of a portion of a sound record, having shading intended to show the gradual changes in translucency representing the sound waves.

In Figure 1 is shown the film 1 as it passes through the picture projecting mechanism of the intermittent feed variety, and then through the sound reproducing apparatus where the film moves constantly. The film may be fed downwardly from the upper reel 3 to the lower reel 4, the latter being provided with the usual "take-up" devices and friction drive pulley 5 with its belt 6, receiving its motion from some uniformly moving portion of the apparatus as usual, or if desired for long productions from some independent motor (not shown). Differential speed control is maintained as usual to insure the proper taking up of the lower portion of the film at a uniform speed irrespective of the varying diameter of the reel.

In taking motion pictures a series of rapid exposures of successive spaces on the film are necessary, usually at the rate of sixteen per second, and with intermittent feed machines this speed cannot be materially increased without damaging the film or losing the light required for successful photography. This period of exposure for each picture space is one-half of this sixteenth of a second, more or less, and the film must remain stationary during exposure. To impress a sound record upon this part of the film while it is subjected to such intermittent action is of course impracticable for obvious reasons. Furthermore during the periods of rest many frequencies of sound waves would be superimposed and blot each other out. Moreover sound recording apparatus applied to the film at its point of exposure for picture taking would interfere with the field of view. Nevertheless synchronism in recording and reproducing the pictures and sounds (with due allowance for the difference in the speed of light and sound waves) is necessary for the best results. This is accomplished both in the recording and reproducing apparatus in the following manner.

The film travels in succession over the guide roller 7, positively driven feed sprocket 8, guide roller 9, upper intermittent sprocket 10 and its guide roller 11, down between the lower intermittent feed sprocket 12 and its guide roller 13, positively driven sprocket 14 and its guide roller 15, thence under the guide roller 16 and over the roller 17 to the receiving reel 4. This feed mechanism forms the loops 18 and 20, the feed sprockets drawing the film from the upper reel, and the sprockets 10 and 12 feeding it intermittently past the lens system at 19, after which the roller 14 and reel 4 cause the film section 21 to pass through the sound reproducing apparatus (or the recording apparatus) at a uniform constant speed. The loops 18 and 20 may be of a length usually employed in motion picture cameras or projecting machines. The usual shutter and other mechanism commonly employed in cameras or projecting machines will be employed, but for simplicity of illustration such parts are omitted.

There are thus two sections of film, spaced apart a fixed distance, one for intermittent exposure in taking or reproducing motion pictures, and the other for continuous exposure in making or reproducing sound records. The pictures and sounds are recorded or reproduced concurrently, and if film sections 19 and 21 in the reproducing machine are spaced or timed the same as in the recording apparatus the pictures and sounds will be in synchronism when reproduced. Varying the relative positions of film sections 19 and 21, or varying the timing of the two exposures will result in varying the synchronism to compensate for the difference between the speed of light and sound waves, so that they both may be so transmitted over considerable distances as to arrive at the selected point in unison. The flat film section 19 is opposite the picture-illuminating section, 22, of the lamp-house 23, and in line with the usual picture-projecting lens and shutter (if one be used) which may be mounted on the frame 2. The lower vertical film section, 21, is opposite the lower section, 24, of the lamp house which, as herein illustrated for convenience of description, is shown as containing an arc lamp, 25, fed from the lighting circuit 26, or any other suitable source. As will be seen, the lamp house 23 is mounted adjustably on guide rails, 27, mounted on the base or stand 28, that carries the entire projecting apparatus.

The lower vertical film section, 21, as well as that portion of the film 1 below the positively-driven sprocket 14, (unlike the upper section 19 and its loops 18 and 20, which are affected by the intermittent-feed mechanism) will travel at a continuous and uniform speed, since the take-up device 5 causes this portion of the film to be wound up on reel 6 under a slight tension as rapidly as the teeth of the steadily revolving sprocket 14 release it. It is this lower section, 21, therefore, which is removed a distance of approximately not more than three picture spaces from section 19, or a total time-interval of about one-fifth (⅕) of a second, (which time interval is susceptible of still further reduction if more than 16 pictures are exhibited per second, that I employ for the reproduction of the sound record that has previously been impressed upon the film along with the pictures. However, I have been able to devise means hereinafter more fully described, whereby even this minute and practically negligible discrepancy in time may be effectively, completely and automatically eliminated.

I prefer for various reasons, in carrying out my invention, to impress such sound waves upon the film in the form of a translucent photographic record, (see Figs. 8 to 12 inclusive,) in which the waves are represented, when developed, by a ribbon or band of varying degrees of translucency represented in the drawings by a series of dots or shaded lines, the parts of the band representing sounds usually merging one into another in continuous succession in the direction of the length of the film. Such a record held to the light, presents a substantially straight band made up of a succession of lights and shadows, in which the alternations of light and shade and the distance between them correspond with and represent the pitch or frequency of the original sound waves, while the depth or intensity of the shading, or the relative degrees of translucency, correspond with and represent their amplitude.

All degrees of light and shade corresponding to the simplest or most complex sound waves may, by properly adjusted and regulated conditions, be accurately recorded.

Fig. 6 shows the sound recording arrangement. In practice it is combined with the camera which may be of any suitable type. The film feeding mechanism may be similar to that shown in Fig. 1 and is not shown in this figure. In the chamber 30 is located any suitable light 31, such for example as an arc light or an incandescent light of any suitable kind capable of having its luminosity varied at the speed of the variations of sound waves. This chamber is provided with a tube, 32, containing a lens, 33, and an adjustable cap-piece, 34, having a raised central portion, 35, pierced with either a narrow slit, 36, as shown in Fig. 3 or a small round or square pin-hole opening 36' such as shown in Fig. 4, corresponding with light openings of like character that are used in the projecting apparatus illustrated in Figs. 1 and 2.

Mounted at the upper rear portion of the apparatus in Fig. 6 is shown a standard 37, containing an adjustable sliding rod 38, that may be extended and turned in any position and if desired may be locked in such position by wing-nut 39. The upper end of rod 38 has a swivel-joint into which is clamped a telephone-transmitter or microphone 40, which is provided with a large tapering horn or megaphone, 41, designed and adapted to collect the atmospheric sound waves and to direct and focus them upon the diaphragm of the transmitter 40. The minimum height of the horn 41, when the device illustrated in this figure is used in connection with a portable motion-picture camera, is preferably such that the entire camera mechanism, including the chamber 30, containing the photophonic recording appliances, may be mounted as a single, self-contained unit below the line of swing of said horn. The mounting of the horn 41 directly upon the camera apparatus is not essential, as the standard 37, the transmitter 40 and sound receiving horn 41, may be located at convenient points either near the camera or at any desired distance.

The transmitter 40, whether mounted on the apparatus or located at a distance therefrom, is in electrical connection through the circuit or line wires, 48, 49, 42, and primary winding, 43, of an induction-coil whose secondary winding, 44, is in series with a condenser, 45, and with the terminals of the lamp 31, as shown. The terminals of the lamp 31, are likewise independently connected, in the usual manner, by means of the circuit wires shown, with a suitable source of direct current 46, and rheostat 47.

In front of the cap 34, is shown the moving film, 1, traveling downwardly in close proximity to the raised portion 35, so that the portion of its surface intended for the record passes by the light opening 36. This section of the film, indicated by the numeral 21, corresponds with the lower vertical film section 21 in Figs. 1 and 2. It will of course be understood, that the sensitive film 1 in Fig. 6 is completely inclosed and protected from extraneous light by the camera box in which it moves, and that the edge portion or portions of the film on which the photographic record is to be received are shielded from the light and are thus left unexposed during the transit of the film behind the shutter-opening of the picture-taking lens.

The operation of the sound-recording apparatus just described is as follows: Electric energy from the source of direct current 46, passing through rheostat 47 by which its intensity is suitably controlled, travels across the carbons of the lamp 31, forming an arc having the characteristics of a sensitive flame that burns with a steady light and at an approximately constant temperature and luminosity. An arc of this character is capable of being converted by a series of slight but rapid variations in the current supply, into what is known as singing or speaking arc, which is capable of setting up atmospheric vibrations that may be heard directly by the ear at a considerable distance from the arc.

Instead however of employing the arc to set up such audible vibrations, I enclose it within the sound-proof casing 30, and cause variation in the strength of the current corresponding to sound waves to be set up. That is, I produce a series of corresponding variations in the intensity of the light emitted by the lamp, by and in accordance with the speech and other sound waves accompanying the scene or action, and simultaneously impressing the successive variations of intensity of the light upon the moving film in the form of a permanent record.

This result I accomplish in the following manner: The sound waves entering the horn 41 from a distant point are concentrated upon the diaphragm of the microphonic transmitter 40, vibrating the same to vary the resistance of the primary circuit containing the battery 42 and the primary coil 43. The latter induces undulatory or alternating currents of high tension corresponding in form and pitch with the sound waves impinging upon the diaphragm, in the secondary coil 44, which currents pass across the condenser 45 and affect the steady current flowing through the arc, 31, from the dynamo or other source 46. The direct current from this source cannot jump across the condenser 45 nor affect the induction coil 44, so that the net result of the variable current impressed upon the current traversing the lamp 31 is to increase and decrease the intensity of the light in accordance with the original sound waves. The light from the lamp 31, (whether this be an arc or incandescent lamp,) passes into the tube 32 and through the lens 33, which converges the rays over the small slit or opening 36 and at least some of them pass through the slit and strike the moving film 1, thus photographically impressing its sensitive surface with a sound record in the manner already explained. As soon as the film is developed, this record is ready for reproduction.

Instead of employing an arc lamp for recording purposes, as in Fig. 6, I find it equally expedient and more satisfactory to use for this purpose an ordinary tungsten or other metal-filament incandescent lamp, such as I have illustrated in Fig. 2, in which such a lamp is shown as arranged and utilized for reproducing purposes. It is well-known that the efficiency of an incandescent lamp, in terms of candle-power produced for a given consumption of current, is very greatly increased with very small increments of current after the lamp has already been raised to and is normally burning at, a relatively high intensity. Furthermore, its actinic power under these conditions is likewise enhanced. It is these combined qualities that I find particularly useful and which I utilize in my process of converting sound waves into electric waves, electric waves into light waves, and light waves into chemical action upon the film, by the method and appliances already described with reference to Fig. 6. Moreover, in substituting incandescent lamp for the arc, the humming due to the rapid expansion and contraction of a heated gas, such as an arc flame, is substantially eliminated. In addition to this the entire superimposed alternating energy of the talking circuit, impressed upon the normally high candle-power lighting direct current, is effectively employed in alternately raising and lowering the normal candle power of the lamp. This variation, it will be seen, occurs in that part of the spectrum in which the slightest addition or subtraction of electrical energy (such as would be caused by a very small to and fro movement of the transmitter diaphragm,) will produce a considerable fluctuation in candle power and in its resultant actinic or photo-chemical action upon the film. Since the induction coil and condenser used by me cause the setting up of induced currents flowing alternately in opposite directions through the lamp filament, those currents that flow with the normal lamp current serve to reinforce it and augment the candle power, while those that flow against the normal lamp current oppose it and cause a diminution of the normal luminosity.

If this action took place while the filament were burning at a very low candle power, say a bright red, the effect of the superposed telephone current would scarcely be noticeable. But if the filament were burning at a brilliant white, or a bluish white incandescence, such superposition of the telephone current, I have found, will produce a very decided and sharply defined variation in candle power, a variation that is entirely too rapid to be perceptible to the eye, but which is quite strongly marked when produced upon a moving film. However, since by the use of my focusing lens I concentrate a considerable amount of light upon an exceedingly small surface, I find that it is not essential to overstrain the lamp-filament. The strength of the source of light and the photographic materials and speed of photography are adjusted to each other for this purpose in accordance with the well known practice in the photographic art. In fact, a very small tungsten filament lamp using an almost insignificant amount of current will more than suffice to produce a strong, well defined and powerful record, a record that is practically free from all scratching and other extraneous mechanical sounds inseparable from the use of ordinary phonographic records.

Coming now to the method and appliances I have devised for reproducing my sound records, reference is made to Fig. 2, which, with certain modifications, shows on a larger scale the sound reproducing apparatus illustrated in Fig. 1, and already partially described.

In Fig. 2, the light chamber, 51, (corresponding with 24 in Fig. 1,) contains a small tungsten or other suitable metal-filament incandescent lamp, 52. This lamp is supplied with direct current from a battery or other source 53. Behind the lamp is mounted a standard, 54, carrying an adjustable reflector 55, which may be secured upon the standard by thumb-screw 56. In front of the lamp, mounted in the wall of the lamp chamber, is a flanged cylinder, 57, which supports an adjustable lens tube provided with a lens, 58, and a rack and pinion, 59, for focussing the lens 58, the latter being shown as secured in its tube by a flanged clamping ring 60. This clamping ring is adapted to enter within a hood, 61, the two forming a light-tight and dust-proof connection between the light-chamber and that part of my sound-reproducing apparatus which co-operates with the film.

This last named apparatus, as shown, consists of a closed, box-like chamber having top and bottom walls 62, 63, two side walls (not shown,) and a rear wall, 64. The top and bottom walls are provided with slots 65, 66, through which the vertical section 21 of the developed film, 1, is free to pass, this section of the film extending between the two lower sprockets 14 and 16, as shown in Fig. 1. The front of the box is closed by the perforated plate 67, (see Figs. 3 and 4,) which may if desired be held in position by a removable clamping frame 68 to facilitate changing the plate to form a wide or a narrow sound record.

Secured to the inner face of the rear wall 64, and preferably covering its entire surface, is a variable, electrical resistance, 69, adapted to be influenced in its conductivity when impinged upon by light. I may employ as such variable resistance a "selenium cell" of any desired or appropriate construction, but I prefer to use a selenium cell or grating, 69, of a special type that I have invented for this purpose, the design and construction of which is illustrated in detail in Fig. 5. This consists of two thin, interlaced sheet-metal stampings, 70 and 72, marked + and — respectively, the space between and around the uniformly spaced, interlaced prongs of which is completely filled with melted selenium, 71. Usually, if desired, a very thin layer of selenium may also be spread over the top surface of the grating 69, that is formed by the two conducting grids 70 and 72. These grids terminate in a pair of binding posts, marked + and —, respectively, secured to the back of the rear wall 64.

Within the chamber, suitably placed between the film section 21 and the variable resistance grating 69, is a small double-concave lens, 73, mounted upon a fixed support, 74, so that its focal axis is opposite the light-opening, 36 or 36', in the plate 67. Upon the shaft of the lower guide roll 16, which if desired may be in the form of a sprocket wheel, I place a small belt 75, arranged to drive a centrifugal governor 76, whose disc, 77, is adapted to raise and lower a lever 78, so as to make or break the circuit of battery 53.

The purpose and function of this governor, 76, and its associated parts, as will be apparent, is automatically to open the circuit of battery, 53, and thus to extinguish the lamp 52, if for any reason the speed of the film 1 is unduly reduced, or when the projecting machine comes to a stop, or again during the starting up of the same from a position of rest until it has gained its minimum or normal operative speed. In this manner, I eliminate all possibility of accidently overheating or burning the film by reason of any prolonged focusing of the light from the lamp 52, upon any given spot on the same. I will say, in passing, that I may also use the same governor to extinguish the picture-projecting lamp, particularly if this be of the high candle-power incandescent type which under certain operating conditions I find it feasible to substitute for the arc, and thereby dispense with the usual fire-shutters now generally employed. The use of this automatic lamp extinguishing safety device will serve, incidentally, to insure a more correct and uniform operation of the projecting apparatus on the part of the attendant.

The operation of the remaining devices described with reference to Fig. 2 are as follows. The rearwardly extending light-rays from the incandescent lamp 52, impinge upon the reflector 55, which in some cases I may make in the form of a parabolic reflector having the lamp, 52, in the focus thereof. From this reflector they are projected against the lens 59, as indicated by the arrows. The forwardly extending rays from the lamp filament are in like manner directly projected upon the same lens, being added to those coming from the reflector 55. The lens 59 concentrates and brings the combined rays thus falling upon it to a focus directly upon that given spot of my sound record, usually located near one edge of the translucent film-section 21, (as indicated more clearly in Figs. 8, 9 and 10,) which at the moment is passing behind the narrow slit or light-opening 36. It will thus be evident that this spot, which may represent, say a portion of a single sound wave, is very highly illuminated, and that the amount of light transmitted through the film at this spot will depend directly upon its relative degree of translucency, which changes rapidly from moment to moment with each succeeding wave that passes the slit. The light rays pass, preferably through a small double-concave lens 73, which is placed close to the film causing them to diverge and to spread preferably over the whole of the large area of my selenium grating 69, as shown by the dotted lines. By this novel means I produce a wide and uniformly distributed variation in the electrical resistance of the selenium between the + and — grids, 70 and 71, which variation will be in substantially direct proportion to the varying intensity of the distributed light.

It may be mentioned here that in reproducing my photophonic sound records, it is not essential to have the emulsion side of the translucent film face the light rays coming from the lamp 52. It suffices merely to transmit the convergent rays at the desired focal intensity through the film so that the plane of the photographically developed sound-record surface will intersect and pass through the concentrated light rays. I prefer to place my sound-reproducing lamp 52, together with its light concentrating and projecting system, on the opposite side of the film from that shown in the drawings, thus reversing the position, with reference to the film 1 at the point 21, of the lamp 52 and the selenium grating 69. Moreover, in the reproduction of my photographic sound records, unlike the reproduction of an ordinary photograph, the sound is the same whether it is reproduced from a negative or a positive print.

On referring to Fig. 1, the manner in which the variation in the electrical resistance of the grating 69 is utilized in the present application of my invention, will now be made clear. To the + and — binding posts of the selenium grating 69, are attached the conducting wires 81 and 82. These wires extend, let us assume, from a picture-projecting booth located on or above the balcony of a theater,—in which booth the entire projection apparatus shown at the left hand portion of Fig. 1 is placed,—to the stage of the same theater. The location of this stage is represented at the right-hand portion of Fig. 1 by the talking-picture screen, 91, and the sound-reproducing horn 90, of my photophonoscope.

The dotted lines 83, 84, represent a continuation of the conducting wires 81, 82, and are run from the aforesaid balcony and joined to the remaining circuit wires, 85, 86, located on the stage, a primary battery, 87, being included at any convenient point in the sound reproducing circuit. Ordinarily, I may connect the wires 85 and 86 directly with one or more telephone receivers placed on the stage, generally behind the screen 91, and in this case the battery 87 is alone sufficient, without any additional appliances, to cause an absolutely pure reproduction of the photographed voice-record, by virtue of the changing resistance of the selenium grating 69, and the automatic corresponding increase and decrease of the current which the battery 87 sends through the telephone or telephones.

However, in order to increase the volume of the reproduced sound, especially when my apparatus is used in large auditoriums, I preferably introduce in this circuit any suitable amplifying device or devices, by which speech may be intensified to fill the entire auditorium. I have illustrated as one type of such amplifying device that I find useful for this purpose, a loud-speaking electro-chemical telephone receiver of a well-known type, to the terminals of which the wires 85 and 86 are connected. This apparatus consists essentially of a diaphragm of relatively large diameter, which I place within the base of the megaphone 90, said diaphragm having a flexible, spring-pressed metallic arm, preferably of palladium, 89, extending from the center thereof and bearing upon the surface of a uniformly driven rotating cylinder, 88, preferably of compressed chalk, that is kept in a moistened condition by any suitable means, as by an occasional wetting of its surface about once or twice a week, from the liquid-containing receptacle 92. With the shaft of cylinder 88, one of the wires leading from the battery, 87, is in electrical contact, the other wire being connected with the arm 89. In some cases I may also introduce an induction coil in this circuit to augment the effect. The passage of a variable current between the moistened cylinder and the arm, by its electrolytic action, effects a corresponding and very pronounced variation in the mechanical friction between the two surfaces. In this manner, oscillations of large amplitude are produced in the diaphragm, in exact accordance with the density of the photographic sound record on the film, 1. The effect of these oscillations upon the column of air contained within the megaphone 90 is such as to still further augment the volume of sound emitted, so that it becomes possible with this arrangement of the various parts of my apparatus, audibly to reproduce and amplify the sound record on the film to such an extent, if necessary, that the reproduced speech, vocal, instrumental and other sounds will be louder and carry farther than the original sound vibrations themselves.

Although I have herein shown and described one specific type of sound-amplifying apparatus, I desire it understood that I do not limit myself to this type, as I may employ any other form of telephonic relay or other sound amplifying devices.

It will now be clear how the original atmospheric sound waves incidental to a given act or scene are automatically converted into light waves, the light waves into a chemical sound record upon the film, and which, together with a similar record of the series of pictures of the scene taken therewith upon the same film, are developed to form a photographic negative, and how this combined picture and sound record may subsequently be transferred, by photoprinting in the usual manner, upon any desired number of positive films. It will further be clear how the voice or other sound record, by merely passing either the negative or a positive film through the reproducing machine in the usual manner, is again automatically and instantaneously converted into light waves, the light waves into electric current waves and the electrical waves either into electro-magnetic waves that operate the diaphragms of one or more telephone receivers by which they are directly again converted into sound waves, or into electro-chemical or other equivalent waves or impulses by which they are amplified, and the amplified waves finally converted into reinforced sound waves that are a reproduction of the original sound waves, free from all superimposed or extraneous disturbing influences.

Notwithstanding the slight difference in displacement between the picture-section 19, and the sound-record section 21, of the film 1, it is possible to project both the picture and the sound corresponding therewith so that they will reach the observer simultaneously and in synchronism. I will now describe one or two methods by which I accomplish this in operating my picture taking and projecting apparatus.

Let us assume that the distance between the screen and the average center of the total number of auditors, as generally distributed throughout the floor and galleries of a large play-house, to be say, 115 feet. The light from the picture reaches the eyes of the auditor at that distance instantaneously, while owing to its lesser speed, the sound would lag behind approximately one-tenth of a second. Of course, it will be realized that this has always been the case in auditoriums, in which the voice of a speaker or singer lags more or less as heard by the auditor, (according to the latter's distance from the stage,) behind the lip motion accompanying the utterance. Consequently, if this can be rectified by talking pictures a decided gain will have been accomplished over the actual performance.

Now, it has been mentioned that, both in my camera and in my reproducing machine, speech is impressed and reproduced, respectively, at some distance on the film below that of the corresponding picture, this overlapping of the two records amounting as was stated, to a time interval, if measured along the length of the film, of approximately one-fifth of a second. But inasmuch as the picture and voice sections, 19 and 21, of the film, are simultaneously exposed at their respective optical centers, both in taking and reproducing the combined record, this apparent displacement is automatically neutralized, and the voice and its picture are normally in as perfect synchronism as if they were both impressed alongside of each other on the film section 19. It still remains, however, to compensate for the slight difference between the speed of the light and sound waves.

It will now become apparent that, in the taking of my picture, it is not essential that the receiving horn, 41, (Fig. 6) be removed to the distance of the average auditor, but it may be placed much nearer the stage than the camera and the voice transmitted to the latter electrically at the same speed as light. The photographic record of this voice will thus be impressed upon the traveling film so as to overtake the photographic record of its corresponding motion-picture, especially since the former is susceptible of being impressed on the negative film at a point several pictures in advance of the latter, as will presently appear. In reproducing from the positive film, the voice record is likewise electrically transmitted from the projecting machine to the stage (as well as to any other desired points in the auditorium), at which it is telephonically reconverted into sound, in advance of the projection of its picture. By thus transmitting sound waves electrically in both directions, at the speed of light, in the manner described, both the sound and the picture may reach the middle of audience simultaneously.

Any desired amount of such phase-displacement along the film, or inter-compensation between the light and sound record, may be given to suit different conditions that may arise, and the same film record may be adjusted to suit such different conditions so as to produce synchronism whether the sound waves are transmitted electrically or by the intervening atmosphere. For example, in taking talking-pictures I may and preferably do normally lengthen the lower loop, 20, to the extent of two, three, or more additional pictures, in which case the sound record can be made to overtake the corresponding scene record to a still greater extent. In exhibiting reproductions of this film in auditoriums of different sizes, all the operator need then do is, in threading up his projecting machine, to adjust the length of this loop to the size of the exhibition hall, or to the average distance that the reproduced sound will have to travel, in order to secure registration between the picture and its sound in the auditorium. By the use of this simple and effective expedient, it becomes immaterial whether the voice record is taken at a point closer to the scene than the picture record, or at the same distance. It will thus be seen that my system is sufficiently flexible to lend itself to the proper taking and reproduction of every conceivable kind of subjects and under the most diverse conditions, with the assurance that either natural or absolute registration between the sound and its picture, whichever may be preferred, be secured and maintained.

Referring now to Fig. 7, this represents a plan view of part of a theater or opera-house, in which performances for my talking-pictures may be staged and in which such pictures may likewise be reproduced. In this figure, 100 represents the stage: 101, the proscenium boxes in front of the wings; 102, the space reserved for the orchestra; 103, the space occupied, below the stage level, by the orchestra seats; 104, the first or second balcony circle; 106, the space behind or over the balcony circle for the picture taking and projecting apparatus; 105 and 107, reserved spaces in the respective corners of the balcony; 108, the side walls of the auditorium; and 109, the rear or stage wall of the same.

Fixed to the front wall of the balcony, at the center thereof and in a position where it will not interfere with the view of the stage, I provide a concave sound-collecting board, 111, secured to said wall by a bracket arm 110, which extends forward and supports near its outer extremity and in such a position as to be directly in the focus of said sound collecting board, a wide-mouthed microphone-transmitter, 112. Wires 113 and 114 run from the transmitter terminals, back along the arm 110 to insulated binding posts 115 and 116, which connect by means of the transmitter circuit wires shown, with the sound-recording appliances of the picture-taking camera, 117. Included in this circuit is shown the transmitter battery 118, and a switch, 119, for opening the battery circuit when the camera is not in use, or when a sound record is not to be made. The mechanism of this camera and its associated sound-recording appliances, are substantially the same as already described with reference to Fig. 6, etc.

Alongside of the camera, 117, is located the talking-picture projecting machine, 120, which is similar to that described with reference to Figs. 1 and 2. Both these machines are mounted together upon a pair of guide rails, 121, upon which they can alternately be moved into and out of their respective operative positions. From the terminal posts of the selenium grating of the projecting machine 120, are brought out the circuit wires, 122, 123, which run back to the stage as shown. A switch, 124, together with a battery 125, is also included in this circuit to enable the operator to open the battery circuit and then cut out the talking or sound reproducing instruments when these are not required. In some cases, I may also include a suitable induction coil, (not shown) in the sound reproducing circuit. Behind the screen 91, which is dropped across the stage, 100, when reproduction is going on, I arrange a series of loud-speaking telephone receivers 93, and also supplement these with additional receivers 94, which are located at the sides of the stage near the wings. These receivers, as shown, are all connected up in series by means of the wire 92, although in some cases I may, and generally prefer, to connect them in parallel circuit. In lieu of these receivers, which I have here represented as an enlarged form of the usual magneto type, I may substitute receivers of a relay or other amplifying type, such, for example, as I have illustrated in and described with respect to Fig. 1. The receivers, 93, may for convenience be mounted on a drop frame that can be lowered into position from the flies when the screen 91 is in use, while the wing receivers, 94, may be permanently attached to the proscenium arch, the framework of the boxes, 101, or other suitable point at the sides of the stage.

The operation of these devices, shown in Fig. 7, is as follows:—Let it be assumed that a grand opera, with full orchestra, and staged with all necessary scenic effects, is to be given, and is to be taken by the camera 117, for the purpose of making a photo-phonoscope film record of the same. The position of the singers in the cast, as distributed over the stage, 100, are indicated by the cross marks, (+) while the instruments of the orchestra, 102, are represented by the small circles (o). As will be seen, the sound-collecting board, 111, with the transmitter, 112, at its focus, is directly in front of both, and at a distance from the stage that will bring the sound-reflecting surface of the collecting board at a fairly approximate average distance of the entire audience from the performers.

Three important features connected with this part of my invention will now at once become apparent. First, the sound collecting area of the surface presented to the stage by the board 111, is many hundreds of times greater than that of a pair of human ears, and that practically the whole of this magnified sound-volume is reflected and concentrated upon a single and exceedingly sensitive mechanical ear, comprising the microphone-transmitter 112. Second, the form and location of the concave board or "sound mirror", 111, are such as will cause it to collect and to reflect into the transmitter, 112, in segregated form vocal and instrumental sounds, overtones, consonant sounds, etc., emanating from every part of the stage and orchestra, however widely separated the singers and instruments may be, as indicated by the dotted lines and arrows showing the direction of the direct and reflected soundwaves. Third, that this arrangement entirely avoids the necessity of compactly grouping the singers and musicians, as has heretofore been the practice in the production of phonograph and gramophone records in order that as much sound as possible, might enter the phonograph horn, and also that it removes the necessity for placing the horn so close to the singers as to be in the way of photographing them. Furthermore, it eliminates the limitations hitherto placed upon such singers in the matter of having to face the phonograph while singing into it, as well as restricting their freedom of movement, both of which, or either alone, might prove fatal to the reproduction in the form of talking pictures of an operatic or dramatic performance.

With my apparatus the singers or actors are not restricted in their actions nor are they confined to a narrow area. In fact, the largest stage or arena may be covered, not only as to the sound record, but also as to the picture record. This will be manifest from an inspection of Fig. 7, in which the camera, 117, is shown at about the average distance of the audience from the stage, so that, without the necessity of employing a wide-angle lens with its unavoidable distortion effects, a natural effect will be given to the view not only of the stage settings, but of the singers and orchestral artists, the sound of whose voices and instruments, respectively, are likewise recorded, along with their accompanying motions upon the film.

It will be evident, moreover, from an inspection of Fig. 7, that the concentrated intensity of the sound waves acting upon the diaphragm of the transmitter, 112, will cause correspondingly powerful variations in the intensity of the beam of light falling upon the sound-recording portion of the film as it passes through the camera, and that this record will act more strongly upon the sound-reproducing appliances and thus be heard with greater clearness by the audience.

To still further increase the accuracy and sensitiveness of my transmitters and to reduce to a minimum the distortion of original characteristics of sound waves in making voice-records, I may in certain cases employ my "liquid" or "capillary" type of microphone transmitters, described in U. S. Letters Patent Nos. 777,808 and 871,737, granted me on December 20, 1904, and November 19, 1907, respectively.

The intensity of a sound of normal strength, varies inversely as the square of its distance from the ear, or in this case, from the sound-collecting board 111. In other words, a voice at the front center of the stage would affect the tansmitter 112 more strongly than the same voice would if removed to the side or rear of the stage. Now, just as the trained human ear is capable of distinguishing between and of individualizing the sounds of the separate instruments of a large orchestra, and as a less carefully trained ear is capable of detecting and separating the combined individual voices of a quartet or a sextette, and of following a single voice moving forward or across the stage, so these various composite sounds will impress themselves in the direct ratio of their varying individual qualities and intensities, upon my microphone-transmitter, and by it be faithfully recorded upon the film in the manner already described.

When my film record is reproduced, as by shifting the projecting machine, 120, shown in Fig. 7, into its central or operative position, and closing the switch, 124, the machine being set in operation, the animated picture portraying the scene and the cast are thrown upon the screen 91. Concurrently therewith the photographic sound record on the film is reproduced in the circuit wires 122, 123, and 92, in which latter are included the loud-speaking telephone receivers 93, extending across the stage behind the screen 91, and the telephone receivers, 94, in front of the screen at the extreme sides of the stage and which are pointed diagonally forward in a manner that will project the sounds therefrom onto the stage and into the auditorium without interception by the screen 91. All of these receivers, being simultaneously influenced by the same electric current, operate in perfect unison, and distribute the reproduced sounds directly upon the stage, along the length of the screen, and into the auditorium, where it is heard by the audience and by it automatically referred to the proper character represented upon the screen.

By this arrangement of my telephone-receivers, I am enabled still further to localize upon the screen the voice of any individual singer. This arrangement will enable me to heighten the effect of a solo number, as a spot-light is now used to bring an actor or singer into greater prominence, by wiring up the telephone through a commutating switch, by which the entire seven receivers shown are normally included in the circuit but are arranged so that a brush or switch-arm may be manipulated to cut in any particular one or more of these receivers alone, which are selected according to the position of the soloist upon the screen, and, which also permits any movement of such character across the screen to be followed up telephonically in the same manner by a corresponding movement of the brush or arm, along the commutator sections or switch points. Similarly, a duet may be directly emphasized, if or while the two characters are widely separated, by the inclusion of a second receiver at the proper point on the screen. By the methods and apparatus just described, I am enabled to reproduce and present the voices and actions of a complete opera or drama with practically the same lifelike realism and thoroughness as the original performance.

The two reserved spaces 105 and 107, before mentioned, which are preferably located in opposite corners of an upper balcony where sufficient unobstructed space is available may be utilized, if required, for the placing against the walls forming said corners, of substitute or additional sound boards, 126 and 127, similar to the board 111, when either still greater sound gathering power, or special effects in recording or in reproducing the sounds, may be desired. The space available at these points generally quite large, thereby permits of the installation of sound-reflecting boards of much larger area at the proper angle to face the stage. Where these additional boards, 126, 127, are to be employed for recording purposes, however, it would not always be desirable to so utilize them without first cutting out of circuit the board 111, unless all three were located at substantially equidistant points from the center of the stage. Nor would it be desirable, except in smaller size theaters, where this would prove useful, to locate sound-collecting boards in these remote corners, 105, 107. For example, in a very large or deep theater in which a stage performance is to be taken, the distance of these corners from the stage would be so great as to cause an appreciable delay in the sound waves reaching them, which might result in causing the sound-record to lag too far behind its picture, and to overcome which would require an unduly large loop.

However, such auxiliary boards, 126, 127, may be utilized in their alternative capacity, as will presently be explained, for sound-reproducing purposes, when remotely located in large public auditoriums and other gathering places, such as opera houses, convention halls and the like,—wherein it is now extremely difficult or impossible to hear the voice of even a loud-speaker in distant galleries and other parts of the building,—and the arrangement indicated will be found highly effective and useful. In this application of auxiliary boards, I substitute for the transmitter 112, and place at the focus of my concave boards, a loud-speaking telephone receiver, 128, similar to those represented by the numerals 93 and 94, and directly included in the same circuit therewith, as by cutting them into the wires 122 and 123. The more or less concentrated sounds issuing from the funnels of these receivers are masked by the reversed position of these funnels with respect to the audience, thereby preventing all direct interference with the principal sounds coming from the vicinity of the screen 91. Instead, they are projected by the funnels rearwardly, directly on to the sound-reflecting surfaces of the boards 126 and 127. These boards thus reverse the preceding operation and distribute the sounds, at a suitably diminished strength, among that usually large part or section of the audience sitting at and near the rear seats and corners 105, 107 and in the upper balconies. It will therefore be seen that by means of such simultaneous and instantaneous telephonic transmission and a judicious distribution of my sound-dispersing boards, 126, 127, I am enabled clearly and audibly to project sound records, if desired, to every part of a large auditorium, so that they not only can be distinctly heard in the remotest nook and corner of the same, but in a manner that will at the same time avoid interference by echoes in halls whose acoustic properties are such as would otherwise produce them.

It will furthermore be evident that, I may also interpose or "plug in" any number of ordinary telephone receivers in my reproducing circuit, which may be used individually, by such auditors as desire them, to listen to the sound-record impressed upon the film, while viewing the picture on the screen relating thereto. I may also state here that I do not restrict or limit myself, in the use of these particular features of my invention, to the electrical distribution of sounds, through an auditorium by means of such sound-collecting and dispersing boards, or by telephones used in connection therewith from a previously formed "sound-record", but that these are likewise applicable to and intended to be used by me for the transmission and more effective distribution within the limits of an auditorium or any other place of public assembly, such for example as an out-door mass meeting, of the voice of the actual speaker or speakers who are addressing the assemblage.

Sound-collecting boards and transmitters can be placed at selected points about the enclosure when making picture and sound records of out-door events, so that records of sounds originating at these points may be impressed separately or collectively upon the film. If, instead, it be preferred to preserve the more natural effect or distance of the various sounds of applause, etc., I use either a single large sound-collecting board, preferably placed just above the roof of the grand stand with my transmitter at the focus, or employ two or more similar smaller boards likewise mounted near each other at the selected location, and having their respective microphone-transmitters electrically connected in parallel or series in the photophonic sound-recording circuit forming part of my camera equipment. Many novel effects may thus be produced.

Referring now to Figs. 8 to 12, inclusive, I have therein shown various typical forms of my film. In Figs. 3 and 10, the sound-record indicated by the numerals 130 and 130ª, may extend or run in a vertical direction at one side of the film, a space being reserved for this record between the right-hand sprocket perforations, 132 or 132ª, and the series of pictures, 133 or 133ª. In Fig. 11, the pictures, 133, are shown as running horizontally, and the sound-record as extending in a horizontal direction below the same. The film in Fig. 9 is provided with a plurality of sound-records, two of these, 130ᶜ and 130ᵈ, extending along the edges of the film outside of the left and right hand sprocket holes 131ᶜ and 132ᶜ respectively. This location permits the use of the existing standard size of motion-picture films without diminution of the size of the pictures, and also shows how photographic sound-records may be impressed upon those portions of the film not at present utilized. These sound records may be of any desired width varying all the way from a fine line, as indicated in Fig. 9, to a narrow ribbon or band, as in Fig. 10, according to the size of the light-opening in the recording cap 24 of Fig. 6.

Fig. 10 shows an extra wide film useful in taking and reproducing performances, on a large scale, in which the entire stage, either with or without its proscenium arch as a frame for the setting, may be shown. This film also has an extra wide space for my sound-record, in order to give it ample capacity for the reception and proper reproduction of the powerful sound vibrations of a large chorus and orchestra as well as for reducing the average light intensity when desired to attain the degree best adapted to photographing sound.

The purpose of the arrangement in Fig. 11 is to minimize the objectionable flickering of the ordinary film and the reduction of illumination caused by the use of a shutter, and thus to bring about a superior picture as well as sound reproduction.

In Fig. 9 I have shown means by which the left and right hand sound records, 130ᶜ and 130ᵈ, may at will be reproduced separately, jointly, or cut out altogether. Two light-tight reproducing tubes, 135 and 135, each of the general type of that shown in Fig. 2, and corresponding with the hood section, 61, in that figure, are provided with small light-openings, 36, that register with their respective sound records. A manually-operated slide, 136, provided with a series of notches, 137, that cooperate with a spring detent, 138, fastened at one end to the outside of right-hand reproducing tube 135, passes through suitable guide slots in the walls of the tubes 135, and 135. The slide 136 is provided with two elongated exposure slots, 139, through which light from the lamp may pass and enter the aperture or apertures 36, when either or both are exposed, and thus cause the audible reproduction of either or both of said records, according to the position of the slide 136 as indicated by the scale shown at the right hand end thereof. It will likewise be obvious that by this arrangement either one or both of the sound records 130ᶜ, 130ᵈ, carried by the film 1, can be reproduced without at the same time reproducing the accompanying picture record, 133, by the simple expedient of screening or cutting off the light from the picture projecting lamp, and also that any one or more of a number of parallel sound-records contained on my talking films may be separately or jointly reproduced, as desired, by a proper disposition of the exposure openings in the slide 136, or its equivalent.

When my films are provided with but a single sound-record, as shown for example, in connection with the type of picture represented in Fig. 8, such sound record need not necessarily be one produced by the voice, nor one directly related to the characters portrayed. It may, instead, consist of some instrumental or orchestral selection appropriate to the act or scene represented by the pictures. In this and other pantomime representations, the appropriate musical selection is a matter of choice and would be merely incidental and serve to add to the effectiveness of the subject exhibited, without necessarily being in synchronism therewith.

To facilitate the reproduction of multiple sound-records, the tubes, 135, are preferably given a slight lateral adjustment, by which the light-openings, 36, may be shifted into alignment with the desired record. In a camera designed for the simultaneous taking of a plurality of individual sound records, a corresponding number of lamps, or sources of light may be employed, and these lamps and their associated projecting lens-tubes are located beneath one another with their centers slightly displaced in a direction transverse to the direction of travel of the film.

The various records on the film may just as readily be reproduced simultaneously in one or more languages to different sections of the auditorium reserved for those understanding the respective languages.

I do not claim herein the recording method or the method of producing combined motion picture and sound records as that part of my invention is the subject matter of divisional application Serial No. 630,197, filed April 6, 1923 (Patent No. 1,473,976, dated November 13, 1923); nor do I claim herein the recording apparatus as that part of my invention is the subject matter of divisional application Serial No. 637,365, filed May 7, 1923; nor do I claim herein the reproducing apparatus as that part of my invention is the subject matter of divisional application Serial No. 633,907, filed April 23, 1923; nor do I claim herein the photographic record per se as that part of my invention is the subject matter of divisional application Serial No. 633,908, filed April 23, 1923; nor do I claim herein the method and installation for producing and for reproducing records in large auditoriums or out-door places as that part of my invention is the subject matter of divisional application Serial No. 633,909, filed April 23, 1923.

Having thus described my invention I claim as new and desire to secure by Letters Patent:—

1. The method of reproducing a sonorous action previously recorded on a photographic film as a band the translucency of which varies along the length thereof with the amplitudes of air vibrations corresponding to the original sonorous action; which method consists in moving the photographic film behind a screen having a small aperture in alignment with the record band, projecting a beam of light of constant intensity through such aperture, restricting the area of the record band exposed to such light to the area of said aperture, and interposing a light-sensitive electric resistance material in an electric circuit, to intercept the light transmitted through the film, whereby the variations in translucency of the photographic record will produce corresponding variations in said electric circuit.

2. The method of sound reproduction which consists in transmitting light of substantially constant intensity through a highly restricted aperture and spreading the transmitted light over a light sensitive electric resistance of relatively large area in an electric circuit, while interposing seriatim in the path of such light successive parts of a sound record, the translucency of which at successively interposed parts corresponds to the successive density and attenuation of the air vibrations accompanying the original sonorous action, restricting the area of exposure of such record as it moves through the beam of light to the area of said aperture, and causing the variations produced in said electric circuit through the variations in translucency of said sound record to be impressed upon a sound amplifying device.

3. The method of sound reproduction which consists in transmitting light of substantially constant intensity through a highly restricted aperture and spreading the transmitted beam of light over a light sensitive electric resistance of relatively large area in an electric circuit, while moving a sound record, the translucency of which varies with the direction of movement thereof in accordance with the density and attenuation of the air vibrations accompanying the original sonorous action, through said beam of light, and limiting the area of exposure of such record to the area of said aperture, whereby the variations in translucency of the photographic record will produce corresponding variations in said electric circuit.

4. The method of sound reproduction which consists in passing light of substantially constant intensity through a small window aperture in a screen and spreading the emerging transmitted light substantially uniformly over a light sensitive electric resistance of relatively large area in a telephonic circuit, while introducing a light absorbing medium adjacent the aperture, varying in translucency in accordance with the amplitudes of air vibrations accompanying the original sonorous action, and restricting the area of exposure of such medium to the area of said aperture.

5. The method of sound reproduction which consists in focusing light of substantially constant intensity or candle power through a small window aperture in a fixed screen upon a contiguous moving sound record having translucencies which vary as successive portions thereof are exposed to the light in accordance with the amplitude of air vibrations accompanying the original sonorous action, restricting the area of exposure of the sound record to the area of the aperture, and spreading the residual light transmitted through the record upon a light sensitive resistance material having relatively large cross-section in an electric circuit.

Signed at New York, in the county of New York and State of New York this 20th day of May, A. D. 1913.

ELIAS E. RIES.